US009921796B2

(12) United States Patent
Ayabe

(10) Patent No.: US 9,921,796 B2
(45) Date of Patent: Mar. 20, 2018

(54) SHARING OF INPUT INFORMATION SUPERIMPOSED ON IMAGES

(71) Applicant: KYOCERA Corporation, Kyoto-shi, Kyoto (JP)

(72) Inventor: Sakurako Ayabe, Yokohama-shi, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 12 days.

(21) Appl. No.: 15/130,294

(22) Filed: Apr. 15, 2016

(65) Prior Publication Data

US 2016/0313969 A1 Oct. 27, 2016

(30) Foreign Application Priority Data

Apr. 24, 2015 (JP) .................................. 2015-089015
Mar. 24, 2016 (JP) .................................. 2016-059833

(51) Int. Cl.
*G09G 5/00* (2006.01)
*G09G 5/377* (2006.01)
(Continued)

(52) U.S. Cl.
CPC .............. *G06F 3/1454* (2013.01); *G06F 1/14* (2013.01); *G06F 3/0412* (2013.01); *G06F 3/16* (2013.01);
(Continued)

(58) Field of Classification Search
CPC ........ G06F 1/14; G06F 3/0412; G06F 3/1454; G06F 3/16; G06T 11/60; G09G 2380/04;
(Continued)

(56) References Cited

U.S. PATENT DOCUMENTS 9,172,905 B2 * 10/2015 Song ...................... H04N 7/141
2001/0044826 A1 11/2001 Ludwig et al.
(Continued)

FOREIGN PATENT DOCUMENTS

EP 1 858 238 A2 11/2007
JP 2008-294789 A 12/2008
(Continued)

OTHER PUBLICATIONS

Extended European Search Report dated Apr. 3, 2017 issued by the European Patent Office in counterpart European Patent Application No. 16 16 6382.8.
(Continued)

*Primary Examiner* — Jin-Cheng Wang
(74) *Attorney, Agent, or Firm* — Procopio Cory Hargreaves and Savitch LLP

(57) ABSTRACT

An electronic apparatus comprises a first display and a controller. The controller is configured to switch between a first display mode in which the first display is configured to display a first image and a second display mode in which the first display is configured to display a second image. The controller is configured to cause the first display in the second display mode to superimpose first input information input to the electronic apparatus or an apparatus other than the electronic apparatus onto the second image, and is configured to cause first display to superimpose, in a case where a display mode of the first display is switched from the second display mode to the first display mode, the first input information superimposed on the second image in the second display mode onto an image corresponding to the second image in the first image.

11 Claims, 12 Drawing Sheets

(51) Int. Cl.
  *G09G 5/12*   (2006.01)
  *G06T 11/60*  (2006.01)
  *G06F 3/14*   (2006.01)
  *H04N 7/15*   (2006.01)
  *H04N 7/14*   (2006.01)
  *G06F 1/14*   (2006.01)
  *G06F 3/041*  (2006.01)
  *G06F 3/16*   (2006.01)

(52) U.S. Cl.
  CPC ............... *G06T 11/60* (2013.01); *G09G 5/12* (2013.01); *G09G 5/377* (2013.01); *H04N 7/141* (2013.01); *H04N 7/147* (2013.01); *H04N 7/148* (2013.01); *H04N 7/15* (2013.01); *G09G 2380/04* (2013.01)

(58) Field of Classification Search
  CPC ............ G09G 5/12; G09G 5/377; H04N 7/15; H04N 7/141; H04N 7/147; H04N 7/148; H04M 2201/50; H04M 3/567; H04M 2250/62; H04L 12/1822; H04L 65/103; H04L 65/1093
  USPC ..... 348/E7.083, 14.01, 14.02; 715/716, 753; 345/629, 636
  See application file for complete search history.

(56) References Cited

U.S. PATENT DOCUMENTS

| | | | |
|---|---|---|---|
| 2002/0031262 A1 | 3/2002 | Imagawa et al. | |
| 2009/0154571 A1* | 6/2009 | Choe | H04N 7/148 375/240.25 |
| 2010/0281373 A1 | 11/2010 | Pueyo et al. | |
| 2011/0181774 A1 | 7/2011 | Masuda | |
| 2012/0317483 A1* | 12/2012 | Shapiro | G06Q 10/101 715/716 |
| 2014/0055552 A1* | 2/2014 | Song | H04N 7/141 348/14.02 |
| 2014/0063174 A1* | 3/2014 | Junuzovic | G06Q 10/101 348/14.02 |
| 2016/0037124 A1 | 2/2016 | Song et al. | |

FOREIGN PATENT DOCUMENTS

| | | |
|---|---|---|
| JP | 2009-141388 A | 6/2009 |
| JP | 2010-198104 A | 9/2010 |
| JP | 2010-244437 A | 10/2010 |
| JP | 2014-44727 A | 3/2014 |

OTHER PUBLICATIONS

Partial European Search Report dated Oct. 10, 2016 issued by the European Patent Office in counterpart European Patent No. 1 616 6382.8.

Office Action dated Jun. 27, 2017 issued in counterpart Japanese Application No. 2016-059833.

* cited by examiner

F I G . 1
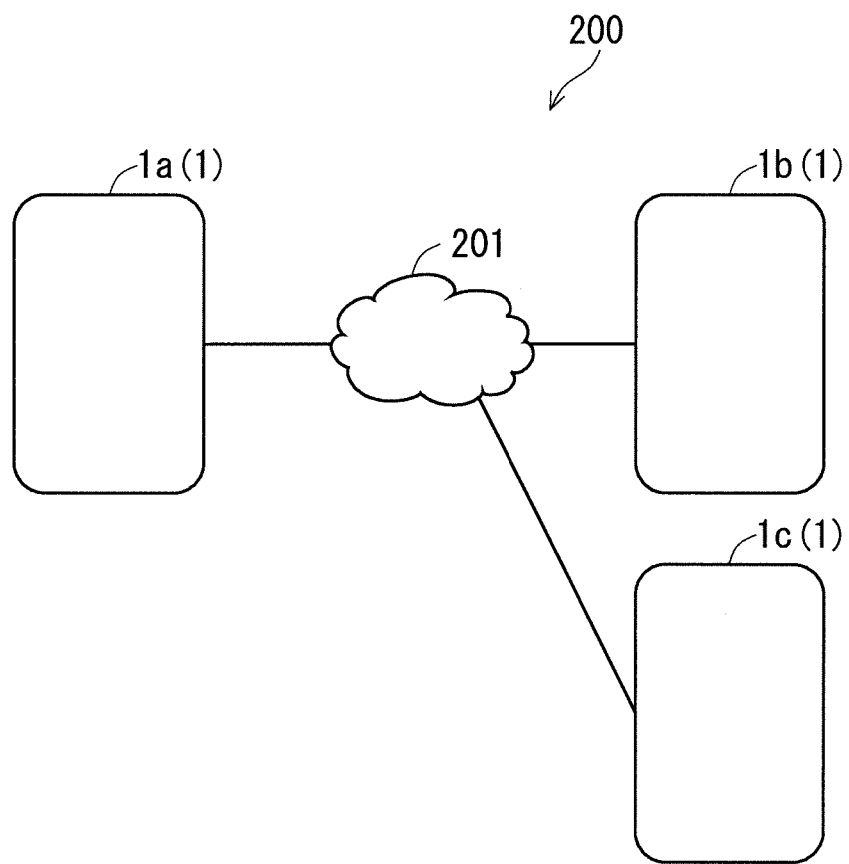

F I G. 4
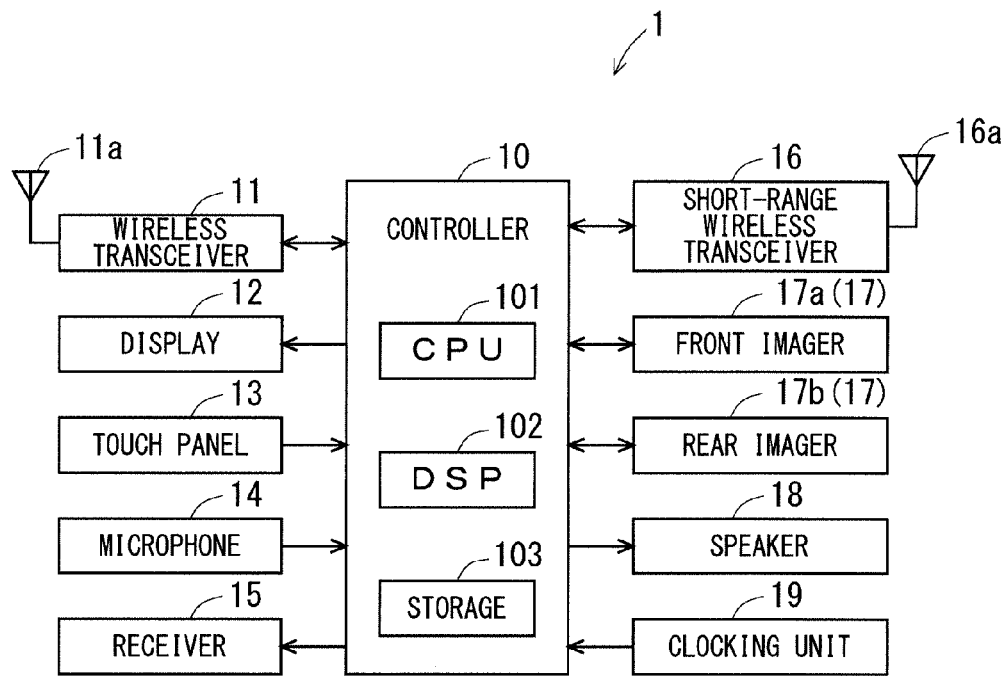
F I G. 5
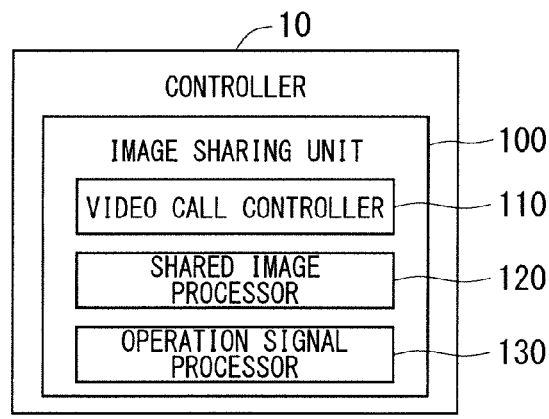

SHARING OF INPUT INFORMATION SUPERIMPOSED ON IMAGES

CROSS-REFERENCE TO RELATED APPLICATION

The present application claims priority under 35 U.S.C. § 119 to Japanese Patent Application Nos. 2015-089015, filed on Apr. 24, 2015, and 2016-059833, filed on Mar. 24, 2016, both entitled "ELECTRONIC APPARATUS, IMAGE DISPLAY SYSTEM, CONTROL PROGRAM, AND METHOD FOR OPERATING ELECTRONIC APPARATUS." The content of which is incorporated by reference herein in their entirety.

FIELD

Embodiments of present disclosure relate generally to electronic apparatuses.

BACKGROUND

Various techniques concerning electronic apparatuses have been disclosed.

SUMMARY

An electronic apparatus, an image display system, and a non-transitory computer readable recording medium are disclosed.

In one embodiment, an electronic apparatus comprises a first display and a controller. The controller is configured to switch between a first display mode in which the first display is configured to display a first image and a second display mode in which the first display is configured to display a second image. The first image is a series of images captured by the electronic apparatus or an apparatus other than the electronic apparatus and is shared by the first display and a second display of the apparatus other than the electronic apparatus. The second image is an image at a point in time in the first image and is shared by the first display and the second display. The controller is configured to cause the first display in the second display mode to superimpose first input information input to the electronic apparatus or the apparatus other than the electronic apparatus onto the second image, and is configured to cause the first display to superimpose, in a case where a display mode of the first display is switched from the second display mode to the first display mode, the first input information superimposed on the second image in the second display mode onto an image corresponding to the second image in the first image.

In one embodiment, an image display system comprises a plurality of electronic apparatuses including a plurality of displays. Each of the plurality of displays has a first display mode in which the display is configured to display a first image and a second display mode in which the display is configured to display a second image. The first image is a series of images captured by one of the plurality of electronic apparatuses and is shared by the plurality of displays. The second image is an image at a point in time in the first image and is shared by the plurality of displays. Each of the plurality of displays in the second display mode is configured to superimpose input information input to one of the plurality of electronic apparatuses onto the second image. Each of the plurality of displays is configured to superimpose, in a case where a display mode of the display is switched from the second display mode to the first display mode, the input information superimposed on the second image in the second display mode onto an image corresponding to the second image in the first image.

In one embodiment, a non-transitory computer readable recording medium is a recording medium that stores a control program for controlling an electronic apparatus. The control program causes the electronic apparatus to execute the steps (a) and (b). The step (a) is a step of displaying a first image that is a series of images captured by one of a plurality of apparatuses including the electronic apparatus and is shared by the plurality of apparatuses. The step (b) is a step of displaying a second image that is an image at a point in time in the first image and is shared by the plurality of apparatuses. In the step (b), the control program causes the electronic apparatus to superimpose input information input to one of the plurality of apparatuses onto the second image. In the step (a), the control program causes the electronic apparatus to superimpose the input information superimposed on the second image in the step (b) onto an image corresponding to the second image in the first image.

BRIEF DESCRIPTION OF THE DRAWINGS

FIG. 1 schematically illustrates an example of a configuration of an image display system.

FIG. 4 illustrates an example of an electrical configuration of the electronic apparatus.

FIG. 5 illustrates an example of a functional block formed in a controller.

DETAILED DESCRIPTION

Configuration of Image Display System

Figure 2:
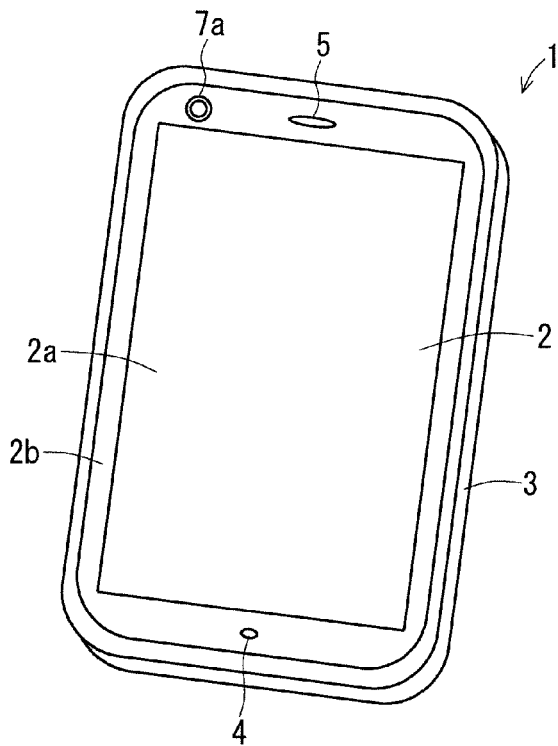
FIG. 2 illustrates a perspective view schematically showing an example of an external appearance of an electronic apparatus.

FIG. 1 schematically illustrates an example of a configuration of an image display system 200. As illustrated in FIG.

1, the image display system 200 includes electronic apparatuses 1a, 1b, and 1c. In the image display system 200, the electronic apparatus 1a can display a preview image (also referred to as a through-the-lens image or a live view image, or simply referred to as a preview) captured by the electronic apparatus 1a and transmit the preview image to the electronic apparatuses 1b and 1c. The electronic apparatuses 1b and 1c can receive and display the preview image captured by the electronic apparatus 1a and transmitted from the electronic apparatus 1a. Thus, the electronic apparatuses 1a to 1c can share and display the preview image captured by the electronic apparatus 1a.

The electronic apparatuses 1a to 1c cause the display of each of the electronic apparatuses 1a to 1c to display, as a preview image, an image acquired by an imager of the electronic apparatus 1a on "as is" basis. Thus, the preview image displayed by the display of each of the electronic apparatuses 1a to 1c is always updated in accordance with images acquired by the imager of the electronic apparatus 1a unless the user provides imaging instructions or the like.

Each of the electronic apparatuses 1a to 1c is, for example, a mobile phone, such as a smartphone. In an example illustrated in FIG. 1, the electronic apparatus 1a functions as a transmission terminal that transmits the preview image captured by itself to the electronic apparatuses 1b and 1c. The electronic apparatuses 1b and 1c function as reception terminals that receive and display the preview image transmitted by the electronic apparatus 1a. The electronic apparatuses 1a to 1c are hereinafter also referred to as electronic apparatuses 1 unless there is a particular need to distinguish among them.

The electronic apparatuses 1a to 1c can communicate with one another through a communication network 201. The communication network 201 is, for example, the Internet or a telephone communication network. In an example illustrated in FIG. 1, the image display system 200 includes one transmission terminal (the electronic apparatus 1a) and two reception terminals (the electronic apparatuses 1b and 1c). Alternatively, the image display system 200 may include one reception terminal or may include three reception terminals or more.

External Appearance of Electronic Apparatus

Figure 3:
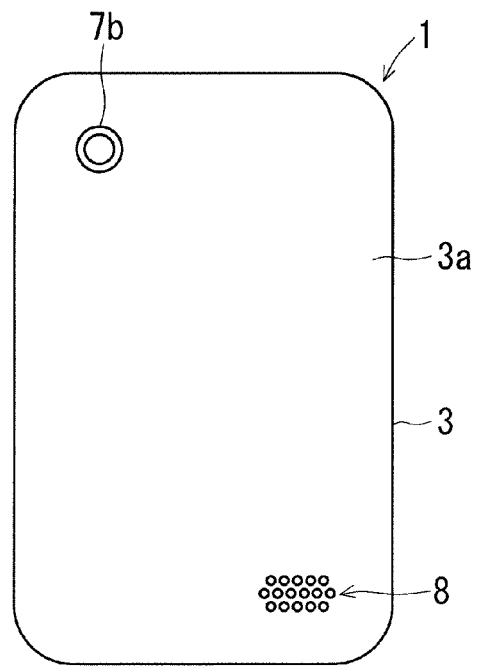
FIG. 3 illustrates a rear view schematically showing an example of the external appearance of the electronic apparatus.

FIG. 2 illustrates a perspective view schematically showing an example of an external appearance of the electronic apparatus 1. FIG. 3 illustrates a rear view schematically showing an example of the external appearance of the electronic apparatus 1. As illustrated in FIGS. 2 and 3, the electronic apparatus 1 includes a cover panel 2 located on the front surface of the electronic apparatus 1 and a case 3 having the cover panel 2 attached thereto. The cover panel 2 and the case 3 form the exterior of the electronic apparatus 1. The electronic apparatus 1 has, for example, an approximately rectangular plate shape in a plan view.

The cover panel 2 includes a display region (also referred to as a display window) 2a transmitting display of a display 12, which will be described below. The display region 2a has, for example, a rectangular shape in a plan view. Visible light emitted from the display 12 passes through the display region 2a and is emitted to the outside of the electronic apparatus 1. The user of the electronic apparatus 1 can visually recognize, from the outside of the electronic apparatus 1, information displayed on the display 12 through the display region 2a. The major portion of a periphery 2b of the cover panel 2 surrounding the display region 2a is opaque and/or not transparent because of, for example, a film or the like attached thereto. Thus, the major portion of the periphery 2b is a non-display portion that does not transmit display of the display 12.

Attached to the rear surface of the cover panel 2 is a touch panel 13, which will be described below. The display 12 is attached to a main surface of the touch panel 13 opposite to another main surface facing the cover panel 2. That is, the display 12 is fitted to the rear surface of the cover panel 2 with the touch panel 13 located therebetween. The user of the electronic apparatus 1 can provide various instructions to the electronic apparatus 1 by performing operations on the display region 2a of the cover panel 2 using a finger or the like.

In an example illustrated in FIG. 2, provided in the upper edge portion of the cover panel 2 is a front-surface-lens transparent part 7a, through which an imaging lens included in a front imager 17a as will be described below can be visually recognized from the outside of the electronic apparatus 1. The cover panel 2 has a receiver hole 5 in the upper edge portion thereof. The cover panel 2 has a microphone hole 4 in the lower edge portion thereof.

In an example illustrated in FIG. 3, provided in the upper edge portion of a rear surface 3a of the case 3 is a rear-surface-lens transparent part 7b, through which an imaging lens included in a rear imager 17b can be visually recognized from the outside of the electronic apparatus 1. The rear surface 3a of the electronic apparatus 1 has speaker holes 8 in the lower edge portion thereof.

Electric Configuration of Electronic Apparatus

FIG. 4 illustrates a block diagram showing an example of an electrical configuration of the electronic apparatus 1. As illustrated in FIG. 4, the electronic apparatus 1 includes a controller 10, a wireless transceiver 11, the display 12, the touch panel 13, a microphone 14, a receiver 15, a short-range wireless transceiver 16, the front imager 17a, the rear imager 17b, a speaker 18, and a clocking unit 19. These constituent components of the electronic apparatus 1 are accommodated in the case 3.

The controller 10 is a kind of computer and includes a central processing unit (CPU) 101, a digital signal processor (DSP) 102, and a storage 103. The controller 10 can manage the overall operation of the electronic apparatus 1 by controlling other constituent components of the electronic apparatus 1.

The storage 103 is a recording medium which is non-transitory and readable by the CPU 101 and the DSP 102, such as a read only memory (ROM) and a random access memory (RAM). The storage 103 stores a main program and a plurality of application programs (hereinafter also simply referred to as applications or apps) for controlling the electronic apparatus 1. Various functions of the controller 10 can be enabled by the CPU 101 and the DSP 102 executing various programs in the storage 103.

The storage 103 may include a non-transitory computer readable recording medium other than ROMs and RAMs. The storage 103 may include, for example, a compact hard disk drive and a solid state drive (SSD). Part or all of the functions of the controller 10 may be enabled by hardware which does not require software in enabling the functions.

The wireless transceiver 11 includes an antenna 11a. In the wireless transceiver 11, the antenna 11a can receive, via a base station, a signal from a mobile phone different from the electronic apparatus 1 or a signal from a communication device such as a web server connected to the Internet. The wireless transceiver 11 can perform an amplification processing and down conversion on a reception signal received by the antenna 11a and output the signal to the controller 10. The controller 10 can perform a demodulation processing and the like on the input reception signal and acquire information included in the reception signal.

Further, the wireless transceiver 11 can perform up conversion and an amplification processing on a transmission signal generated by the controller 10 and wirelessly transmit the processed transmission signal from the antenna 11a. The transmission signal from the antenna 11a is received, via the base station, by a mobile phone other than the electronic apparatus 1 or a communication device connected to the Internet such as a web server.

The display 12 is, for example, a liquid crystal display or an organic electroluminescent (EL) display. The display 12 is controlled by the controller 10, and can display a variety of information, such as characters, symbols, figures, and images, accordingly. The information displayed by the display 12 can be visually recognized by the user of the electronic apparatus 1 through the display region 2a of the cover panel 2.

The touch panel 13 can detect operations performed on the display region 2a of the cover panel 2 with an operator, such as a finger. The touch panel 13 is, for example, a projected capacitive touch panel. When the user performs an operation on the display region 2a of the cover panel 2 with the operator, such as the finger, an operation signal corresponding to the operation is input through the touch panel 13 to the controller 10. The controller 10 can specify the details of the operation performed on the display region 2a on the basis of the operation signal from the touch panel 13, and perform processing in accordance with the details. The user can provide various instructions to the electronic apparatus 1 by performing an operation on the display region 2a with a pen for electrostatic touch panels such as a stylus pen.

The short-range wireless transceiver 16 includes an antenna 16a. The short-range wireless transceiver 16 can perform wireless communication through the use of the antenna 16a. The communication area for the short-range wireless transceiver 16 is smaller than the communication area for the wireless transceiver 11. The short-range wireless transceiver 16 can perform communication in accordance with Bluetooth™ or the like.

The front imager 17a includes an imaging lens, an imaging element, and the like. The front imager 17a can capture a preview image, a still image, and a moving image in accordance with the control by the controller 10. The imaging lens of the front imager 17a can be visually recognized from the front-surface-lens transparent part 7a on the front surface of the electronic apparatus 1. Thus, the front imager 17a can capture an object in front of the electronic apparatus 1, or equivalently, on the cover panel 2 side.

The rear imager 17b includes an imaging lens, an imaging element, and the like. The rear imager 17b can capture a preview image, a still image, and a moving image in accordance with the control by the controller 10. The imaging lens of the rear imager 17b can be visually recognized from the rear-surface-lens transparent part 7b on the rear surface 3a of the case 3. Thus, the rear imager 17b can capture an object in front of the rear surface 3a of the case 3. The front imager 17a and the rear imager 17b are hereinafter also referred to as imagers 17 unless there is a particular need to distinguish between them.

The microphone 14 can convert a sound input from the outside of the electronic apparatus 1 into an electric sound signal and output the electric sound signal to the controller 10. The sound from the outside of the electronic apparatus 1 is input to, for example, the microphone 14 through the microphone hole 4 in the front surface of the cover panel 2.

The speaker 18 is, for example, a dynamic speaker. The speaker 18 can convert an electric sound signal from the controller 10 into a sound, and output the sound. The sound output from the speaker 18 is output from, for example, the speaker holes 8 in the rear surface 3a of the case 3 to the outside of the electronic apparatus 1. The level of the sound output from the speaker holes 8 is set to such a degree that the sound can be heard at a location away from the electronic apparatus 1.

The receiver 15 outputs a reception sound and is, for example a dynamic speaker. The receiver 15 can convert an electric sound signal from the controller 10 into a sound and output the sound. The sound output from the receiver 15 is output from, for example, the receiver hole 5 in the front surface of the electronic apparatus 1 to the outside. The level of the sound output from the receiver hole 5 is set to be lower than, for example, the sound output from the speaker 18 through the speaker holes 8.

The receiver 15 may be replaced with a piezoelectric vibrating element. The piezoelectric vibrating element can be controlled by the controller 10 and vibrate in accordance with a sound signal. The piezoelectric vibrating element is located on, for example, the rear surface of the cover panel 2 and can cause the cover panel 2 to vibrate due to the vibration of the piezoelectric vibrating element itself in accordance with the sound signal. The user can receive the vibration of the cover panel 2 as a voice by moving the cover panel 2 close to his or her ear. The piezoelectric vibrating element, which may be disposed in place of the receiver 15, does not require the receiver hole 5.

The clocking unit 19 can obtain the current time and the current date. The clocking unit 19 includes, for example, a real time clock (RTC). The clocking unit 19 can output, to the controller 10, the time information indicating the obtained time and the date information indicating the obtained date.

Operation of Electronic Apparatus

The operation of the electronic apparatus 1 will be described below in detail. The following description will be given assuming that the image display system 200 includes the electronic apparatus 1a operating as a transmission terminal and the electronic apparatus 1b operating as a reception terminal.

FIG. 5 illustrates an example of functional blocks formed in the controllers 10 of the electronic apparatuses 1a and 1b. The storage 103 stores an image sharing application. The electronic apparatuses 1a and 1b each execute the image sharing application, so that the displays 12 of the electronic apparatuses 1a and 1b can share and display a preview image captured by the rear imager 17b of the electronic apparatus 1a.

In one embodiment, the image sharing application has a video call function. Owing to the video call function, the electronic apparatus 1a can communicate with the electronic apparatus 1b while causing the display 12 thereof to display a video call image captured by the front imager 17a of the electronic apparatus 1b. Owing to the video call function, the electronic apparatus 1b can communicate with the electronic apparatus 1a while causing the display 12 thereof to display the video call image captured by the front imager 17a of the electronic apparatus 1a. That is, the electronic apparatuses 1a and 1b each execute the image sharing application, so that the electronic apparatuses 1a and 1b can share the preview image captured by the rear imager 17b of the electronic apparatus 1a and cause the respective displays 12 to display the preview image, and at the same time, the electronic apparatuses 1a and 1b can perform video call with each other through the displaying of the video call image captured by the front imager 17a of the video call counterpart. The controller 10 executing the main program executes the image sharing application, so that an image sharing unit 100 is formed in the controller 10 as illustrated in FIG. 5. The image sharing unit 100 includes a video call controller 110, a shared image processor 120, and an operation signal processor 130.

While executing the image sharing application, the electronic apparatuses 1a and 1b can operate in a video call mode, in which the electronic apparatuses 1a and 1b perform video call in accordance with the control by the video call controller 110. The electronic apparatus 1a operating in the video call mode can operate in a transmission mode, in which the electronic apparatus 1a transmits the preview image captured by the rear imager 17b of the electronic apparatus 1a to the electronic apparatus 1b. The electronic apparatus 1a operating in the transmission mode operates as a transmission terminal in the image display system 200. Meanwhile, the electronic apparatus 1b operating in the video call mode can operate in a reception mode, in which the electronic apparatus 1b receives the preview image transmitted by the electronic apparatus 1a. The electronic apparatus 1b operating in the reception mode operates as a reception terminal in the image display system 200. The electronic apparatus 1a operating in the transmission mode and the electronic apparatus 1b operating in the reception mode are hereinafter also referred to as a transmission terminal 1a and a reception terminal 1b, respectively.

In accordance with the control by the controller 10, the display 12 of the transmission terminal 1a and the display 12 of the reception terminal 1b can operate in a first display mode (hereinafter also referred to as a preview mode), in which the displays 12 share and display a series of preview images (hereinafter also referred to as a first preview image) captured by the transmission terminal 1a. The display 12 of the transmission terminal 1a and the display 12 of the reception terminal 1b can operate in a second display mode (hereinafter also referred to as a preview suspension mode), in which the displays 12 share and display a preview image (hereinafter also referred to as a second preview image) displayed at the suspension of the preview mode from among a series of preview images captured by the electronic apparatus 1a.

The first preview image is the image that is acquired by the rear imager 17b of the transmission terminal 1a and is displayed on the display 12 on "as is" basis, and thus the first preview image is updated all the time. The first preview image can be referred to as a kind of moving image. Meanwhile, the second preview image is the image obtained at a point in time from the continuously updated first preview image, and thus the second preview image is a still image. Unlike the first preview image, the second preview image is a still image, and thus is not replaced with another image newly obtained by the rear imager 17b of the transmission terminal 1a. The second preview image can be referred to as a frame image included in the first preview image being a moving image.

The electronic apparatus 1 can operate, in accordance with the control by the controller 10, as a transmission terminal that operates in the transmission mode or as a reception terminal that operates in the reception mode. The following description will be given assuming that the electronic apparatus 1a operates in the transmission mode and the electronic apparatus 1b operates in the reception mode.

Figure 6:
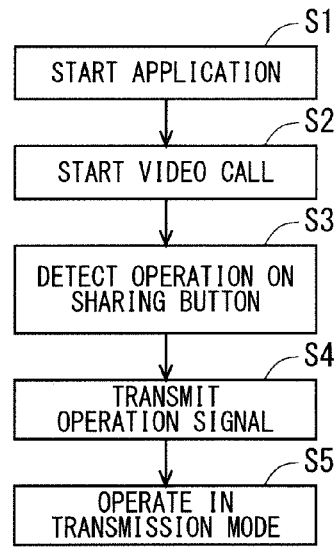
FIG. 6 illustrates a flowchart showing an example of an operation of the electronic apparatus.

FIG. 6 illustrates a flowchart showing an example of the operation of the electronic apparatus 1a operating as the transmission terminal. Firstly, in Step S1, the controller 10 of the electronic apparatus 1a executes (starts) the image sharing application in the storage 103. The display 12 displays, for example, an initial screen (hereinafter also referred to as a home screen) in the initial state prior to the execution of various applications by the electronic apparatus 1. The display 12 displays figures (hereinafter also referred to as application execution figures) for executing applications on the home screen. The application execution figures may include figures referred to as icons. In a case where the touch panel 13 detects that the user has performed a selection operation on the application execution figure displayed on the display 12 for executing the image sharing application, the controller 10 executes the image sharing application in the storage 103.

As an example of the selection operation on the application execution figure displayed by the display 12, the user moves an operator, such as a finger, close to the application execution figure displayed on the display region 2a of the cover panel 2, and then moves the operator away from the application execution figure. As another example of the selection operation on the application execution figure, the user brings the operator, such as a finger, into contact with the application execution figure displayed on the display region 2a of the cover panel 2, and then moves the operator away from the application execution figure. These operations are referred to as tap operations. The selection operations based on the tap operations are used as not only selection operations on the application execution figures but also selection operations on images displayed by the display 12. The description of the selection operations based on tap operations will not be repeated.

Subsequent to the execution of the image sharing application in the electronic apparatus 1a in Step S1, Step S2 is performed. In Step S2, the electronic apparatus 1a operates in the video call mode for performing a video call in accordance with the control by the video call controller 110. The electronic apparatus 1b also executes the image sharing application in response to a predetermined operation on the electronic apparatus 1a. For example the electronic apparatus 1b executes the image sharing application in response to an incoming video call originated from the electronic apparatus 1a. If the electronic apparatus 1b answers the incoming video call originated from the electronic apparatus 1a, a video call between the electronic apparatus 1a and the electronic apparatus 1b is started.

Figure 7:
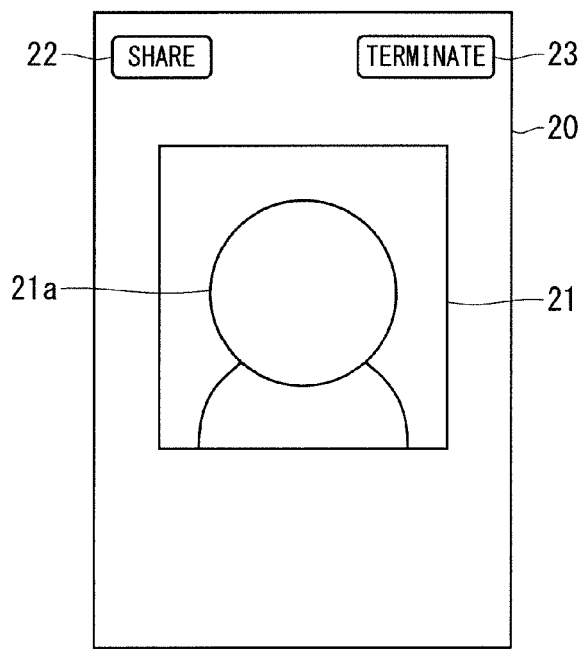
FIG. 7 schematically illustrates an example of a video call screen.

FIG. 7 schematically illustrates an example of a video call screen 20 displayed by the displays 12 of the electronic apparatuses 1a and 1b operating in the video call mode. As illustrated in FIG. 7, displayed on the video call screen 20 is a video call image 21 captured by the video call counterpart. The image 21 displayed by the electronic apparatus 1a is captured by, for example, the front imager 17a of the electronic apparatus 1b. The image 21 includes, for example, a face 21a of the video call counterpart. Thus, the user of the electronic apparatus 1a can have a conversation while seeing the face 21a of the user of the electronic apparatus 1b. Meanwhile, the image 21 displayed by the electronic apparatus 1b is captured by, for example, the front imager 17a of the electronic apparatus 1a. The image 21 is sequentially updated, and thus can be regarded as a kind of moving image. Furthermore, displayed on the video call screen 20 of each of the electronic apparatuses 1a and 1b are a sharing button 22 for displaying a shared image, which will be described below, and a termination button 23 for terminating the image sharing application.

In a case where the touch panel 13 detects an operation on the termination button 23 during the execution of the image sharing application, the controller 10 terminates the execution of the image sharing application. In response to the termination of the image sharing application, the display 12 displays, for example, the home screen again.

The operations of the electronic apparatus 1 are not limited to tap operations performed on the buttons displayed by the display 12. For example, hard buttons on the case 3 may be pushed down. This holds true for other operations which will be described below, and the description thereof will not be repeated.

Next, in Steps S3 to S5, a series of processing is executed such that the electronic apparatus 1a operates in the transmission mode and the electronic apparatus 1b operates in the reception mode.

Firstly, in Step S3, the image sharing unit 100 of the electronic apparatus 1a detects an operation on the sharing button 22 displayed by the display 12 of the electronic apparatus 1a. In particular, the image sharing unit 100 detects an operation on the sharing button 22 in response to an operation signal from the touch panel 13. Next, in Step S4, the operation signal processor 130 of the electronic apparatus 1a causes the wireless transceiver 11 to transmit, to the electronic apparatus 1b, the operation signal indicating that an operation has been performed on the sharing button 22 displayed by the display 12 of the electronic apparatus 1a. Then, in Step S5, the electronic apparatus 1a starts operating in the transmission mode. Meanwhile, the wireless transceiver 11 of the electronic apparatus 1b receives the operation signal transmitted from the electronic apparatus 1a and indicating that an operation has been performed on the sharing button 22 displayed by the electronic apparatus 1a. The electronic apparatus 1b operates in the reception mode accordingly.

The above-mentioned example has been described assuming that the electronic apparatus 1a operates in the transmission mode and the electronic apparatus 1b operates in the reception mode. Alternatively, the electronic apparatus 1b operates in the transmission mode and the electronic apparatus 1a operates in the reception mode in a case where an operation on the sharing button 22 displayed by the electronic apparatus 1a has not been detected and an operation on the sharing button 22 displayed by the electronic apparatus 1b has been detected.

Sharing Preview Screen

The following describes, in detail, how the transmission terminal 1a (the electronic apparatus 1 operating in the transmission mode) and the reception terminal 1b (the electronic apparatus 1 operating in the reception mode) operate to share and display the preview image captured by the transmission terminal 1a.

Figure 8:
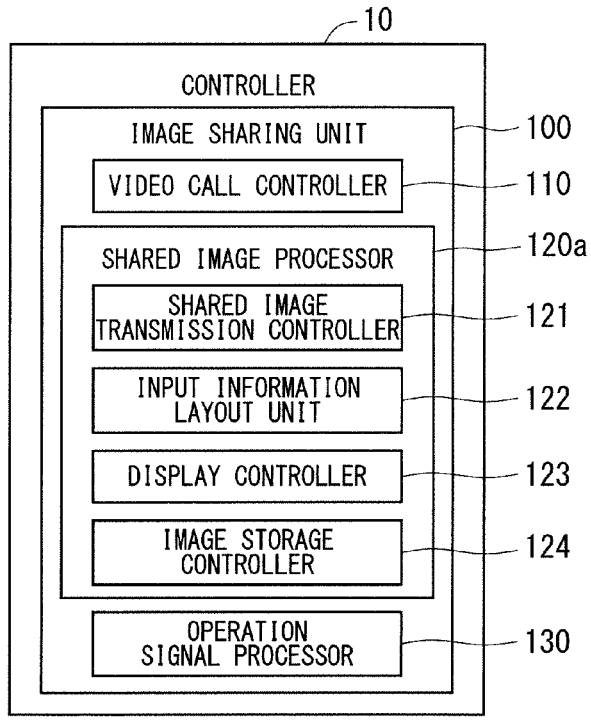
FIG. 8 illustrates an example of a functional block formed in the controller.
Figure 9:
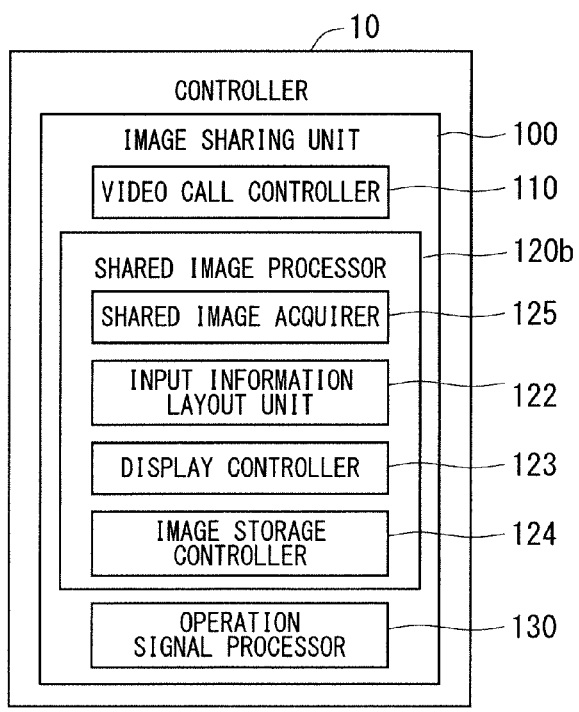
FIG. 9 illustrates an example of a functional block formed in the controller.

FIG. 8 illustrates an example of a functional block formed in the controller 10 of the transmission terminal 1a. FIG. 9 illustrates an example of a functional block formed in the controller 10 of the reception terminal 1b. FIGS. 8 and 9 each illustrate the details of the functional block formed in the shared image processor 120 in FIG. 5. With reference to FIG. 8, the shared image processor 120 formed in the transmission terminal 1a is referred to as a shared image processor 120a. With reference to FIG. 9, the shared image processor 120 formed in the reception terminal 1b is referred to as a shared image processor 120b. As illustrated in FIG. 8, formed in the shared image processor 120a of the transmission terminal 1a are a shared image transmission controller 121, an input information layout unit 122, a display controller 123, and an image storage controller 124. As illustrated in FIG. 9, formed in the shared image processor 120b of the reception terminal 1b are a shared image acquirer 125, the input information layout unit 122, the display controller 123, and the image storage controller 124.

Figure 10:
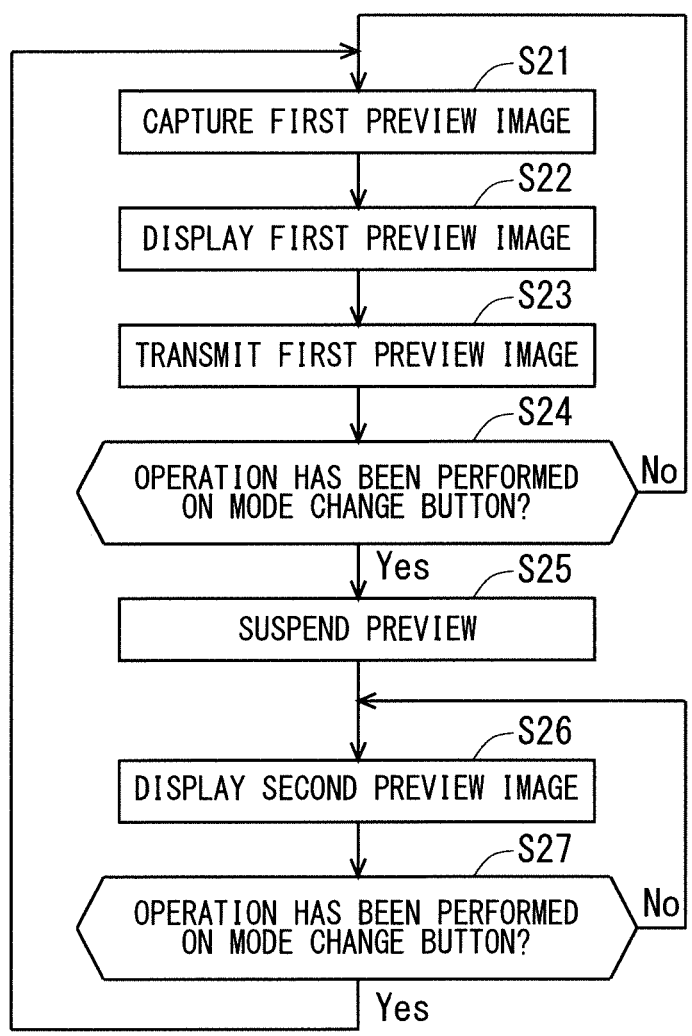
FIG. 10 illustrates a flowchart showing an example of an operation of a transmission terminal.

FIG. 10 illustrates a flowchart showing an example of an operation of the transmission terminal 1a. With reference to the flowchart in FIG. 10, the following describes the operation through which the transmission terminal 1a and the reception terminal 1b share and display the preview image captured by the transmission terminal 1a. Firstly, in Step S21, the transmission terminal 1a captures the first preview image. The transmission terminal 1a causes the rear imager 17b or the like to capture the first preview image. In the transmission terminal 1a, for example, the front imager 17a can capture the video call image 21, and at the same time, the rear imager 17b can capture the first preview image separately from the video call image 21.

Next, in Step S22, the display 12 of the transmission terminal 1a displays the first preview image in accordance with the control by the display controller 123. Then, in Step S23, the shared image transmission controller 121 causes the wireless transceiver 11 to transmit, as the shared image, the first preview image captured by the rear imager 17b to the reception terminal 1b. The shared image acquirer 125 of the reception terminal 1b acquires the first preview image received by the wireless transceiver 11 of the reception terminal 1b. This means that the shared image acquirer 125 of the reception terminal 1b acquires the first preview image transmitted by the transmission terminal 1a. Then, in accordance with the control by the display controller 123, the display 12 of the reception terminal 1b displays the first preview image acquired by the shared image acquirer 125. A series of processing in Steps S21 to S23 is performed, so that the displays 12 of the transmission terminal 1a and the reception terminal 1b operate in the preview mode, in which the respective displays 12 share and display the first preview image captured by the transmission terminal 1a.

Figure 11:
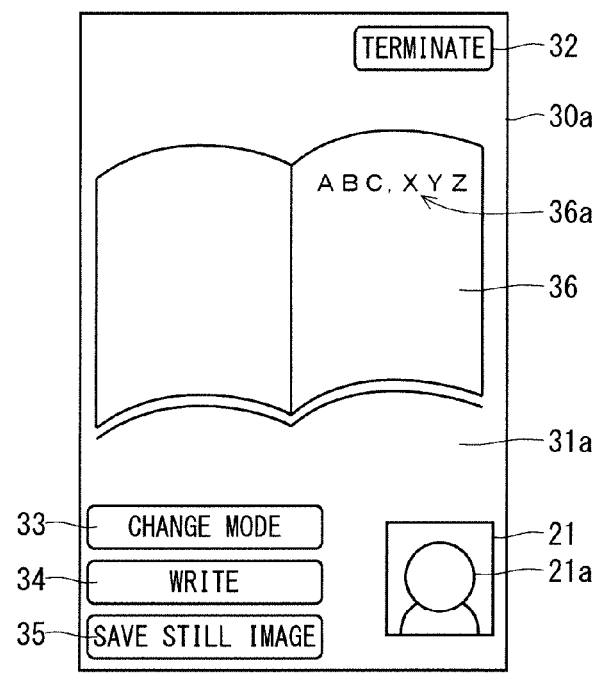
FIG. 11 schematically illustrates an example of a shared screen.

FIG. 11 schematically illustrates an example of a shared screen 30a displayed by the display 12 of each of the transmission terminal 1a and the reception terminal 1b in the preview mode. As illustrated in FIG. 11, displayed on the shared screen 30a are a first preview image 31a captured by the transmission terminal 1a and the video call image 21 captured by the video call counterpart. The image 21 is superimposed on the first preview image 31a. Furthermore, for the shared screen 30a, a termination button 32, a mode change button 33, a write button 34, and a still image save button 35 are superimposed on the first preview image 31a. These buttons will be described below in detail.

The first preview image 31a is a shared image shared and displayed by the display 12 of the transmission terminal 1a and the display 12 of the reception terminal 1b. In an example illustrated in FIG. 11, the first preview image 31a includes an object 36 having strings 36a written thereon. The object 36 is, for example, a travel brochure, and the user of the transmission terminal 1a and the user of the reception terminal 1b can talk with each other over the details of travel through a video call while looking at the shared image of the travel brochure.

Next, in Step S24, the shared image processor 120a of the transmission terminal 1a determines whether an operation has been performed on the mode change button 33. In particular, the shared image processor 120a determines whether an operation has been performed on one of the mode change buttons 33 displayed by the transmission terminal 1a and the reception terminal 1b. The transmission terminal 1a can determine whether an operation has been performed on the mode change button 33 of the transmission terminal 1a in response to an operation signal from the touch panel 13. In a case where an operation is performed on the mode change button 33 of the reception terminal 1b, the operation signal processor 130 of the reception terminal 1b causes the wireless transceiver 11 to transmit, to the transmission terminal 1a, the operation signal indicating that the operation has been performed on the mode change button 33. The shared image processor 120a of the transmission terminal 1a can determine that an operation has been performed on the mode change button 33 displayed by the reception terminal 1b when acquiring the operation signal received by the wireless transceiver.

In response to a negative determination in Step S24, Step S21 is performed again. Until a positive determination is made in Step S24, the display 12 of the transmission terminal 1a and the display 12 of the reception terminal 1b keep operating in the preview mode, in which the respective displays 12 display the first preview image 31a captured by the transmission terminal 1a.

In response to a positive determination made in Step S24, Step S25 is performed. In Step S25, the display 12 of the transmission terminal 1a and the display 12 of the reception terminal 1b stop operating in the preview mode.

Next, in Step S26, the display 12 of the transmission terminal 1a and the display 12 of the reception terminal 1b display, in accordance with the control by the display controller 123, the first preview image 31a displayed at the suspension of the preview mode, namely, the second preview image. The processing in Step S25 and Step S26 are performed, so that the display 12 of the transmission terminal 1a and the display 12 of the reception terminal 1b operate in the preview suspension mode, in which the respective displays 12 display the second preview image captured by the transmission terminal 1a.

Figure 12:
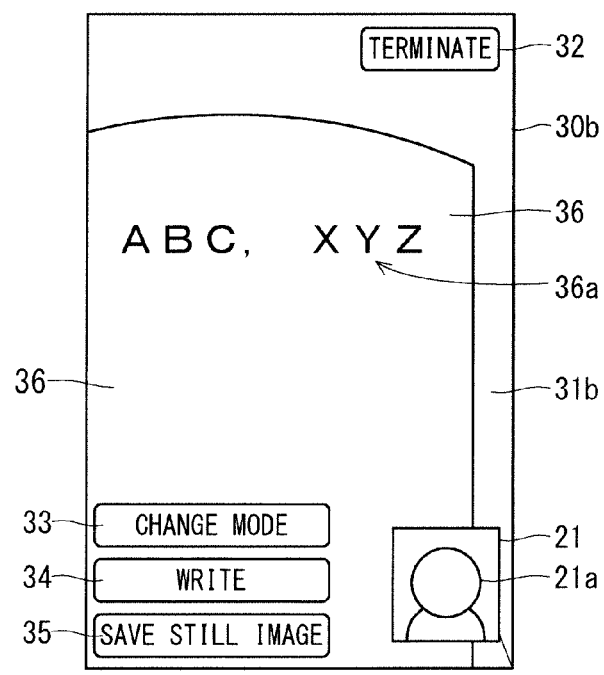
FIG. 12 schematically illustrates an example of the shared screen.

FIG. 12 schematically illustrates an example of a shared screen 30b displayed by the display 12 of the transmission terminal 1a and the display 12 of the reception terminal 1b in the preview suspension mode. As illustrated in FIG. 12, displayed on the shared screen 30b are a shared second preview image 31b and the video call image 21 captured by the video call counterpart. The image 21 is superimposed on the second preview image 31b. Furthermore, for the shared screen 30b, the termination button 32, the mode change button 33, the write button 34, and the still image save button 35 are superimposed on the second preview image 31b.

In an example illustrated in FIG. 12, the second preview image 31b is an enlarged view of the upper right portion of the object 36 having the strings 36a written thereon. The second preview image 31b illustrated in FIG. 12 is, for example, an image obtained in response to an operation on the mode change button 33 while the display 12 in the preview mode displays the enlarged view of the upper right portion of the object 36. Thus, the display 12 in the preview suspension mode displays, as the second preview image 31b, the first preview image 31a obtained at the suspension of the preview mode from among the first preview images 31a displayed by the display 12 in the preview mode, so that the user can look carefully, as the second preview image 31b, the image obtained at the suspension of updating of the first preview image 31a displayed by the display 12 in the preview mode.

Next, in Step S27, the shared image processor 120a determines whether an operation has been performed on the mode change button 33. In particular, the shared image processor 120a determines whether an operation has been performed on one of the mode change buttons 33 displayed by the transmission terminal 1a and the reception terminal 1b. This processing is similar to the processing in Step S24, and thus the description thereof is omitted.

In response to a negative determination in Step S27, Step S26 is operated again. Until a positive determination is made in Step S27, the display 12 of the transmission terminal 1a and the display 12 of the reception terminal 1b keep operating in the preview suspension mode, in which the respective displays 12 display the shared second preview image 31b.

In response to the positive determination is made in Steps S27, Step S21 is performed again. Then, the display 12 of the transmission terminal 1a and the display 12 of the reception terminal 1b operate in the preview mode, in which the respective displays 12 display the first preview image 31a captured by the transmission terminal 1a.

In a case where the touch panel 13 detects an operation on the termination button 32 while the display 12 operates in the preview mode or the preview suspension mode, the display 12 stops operating in the preview mode or the preview suspension mode. Then, the display 12 displays, for example, the video call screen 20 again.

Displaying Input Information

The electronic apparatus 1 operates in the write mode, in which the user can input the input information to the electronic apparatus 1, by detecting an operation on the write button 34 displayed by the display 12 while the display 12 operates in the preview mode or the preview suspension mode. The display 12 superimposes, onto the preview image, the input information input to the electronic apparatus 1 operating in the write mode.

Displaying Input Information in Preview Suspension Mode

Figure 13:
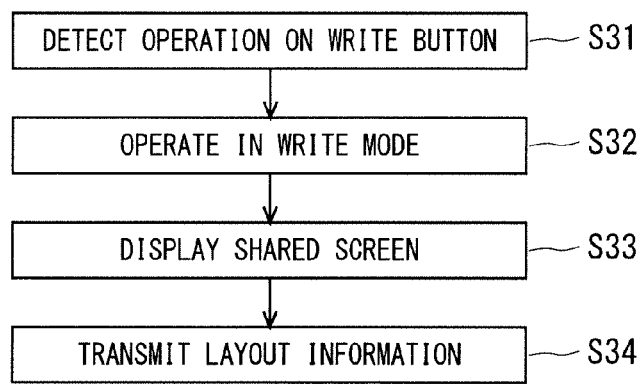
FIG. 13 illustrates a flowchart showing an example of an operation of the electronic apparatus.

FIG. 13 illustrates a flowchart showing an example of the operation in which the input information is input to the reception terminal 1b and the transmission terminal 1a and the reception terminal 1b display the input information accordingly. With reference to the flowchart in FIG. 13, the following description will be given assuming that the input information is input to the reception terminal 1b while the display 12 of the transmission terminal 1a and the display 12 of the reception terminal 1b operate in the preview suspension mode.

Firstly, in Step S31, the touch panel 13 of the reception terminal 1b detects an operation on the write button 34 displayed by the display 12 of the reception terminal 1b.

Next, in Step S32, the reception terminal 1b operates in the write mode. While the reception terminal 1b operates in the write mode, the user can input information to the reception terminal 1b. For example, the user can draw a figure and the like on the display region 2a with an operator, such as a finger, and information such as the figure is input to the reception terminal 1b accordingly. Such an information inputting operation is detected by the touch panel 13.

Figure 14:
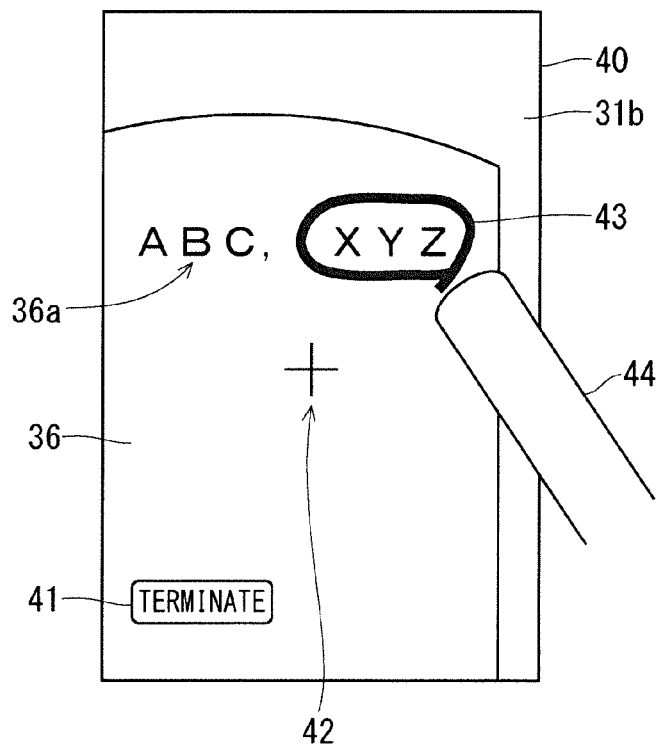
FIG. 14 illustrates reception of input information.

FIG. 14 illustrates inputting of the input information to the reception terminal 1b operating in the write mode. FIG. 14 is given assuming that an operation is performed on the write button 34 displayed by the reception terminal 1b while the display 12 of the transmission terminal 1a and the display 12 of the reception terminal 1b operate in the preview suspension mode. As illustrated in FIG. 14, displayed on a write screen 40 displayed by the display 12 of the reception terminal 1b operating in the write mode are the second preview image 31b, a termination button 41, a reference figure 42, and input information 43. The reference figure 42 is a figure that provides a reference for the display position and the display size of the input information 43 as will be described below, and is displayed on, for example, the midsection of the write screen 40. In an example illustrated in FIG. 14, the input information 43 has been input by tracing a figure with an operator 44 so as to surround a part of the strings 36a on the write screen 40. The input information 43 is superimposed on the second preview image 31b on the write screen 40. For example, the user can mark a point in the second preview image 31b that attracts his or her attention. The user can add a note, a comment, and the like on the second preview image 31b.

The display position of the input information 43 on the write screen 40 is stored in the storage 103 as a display position relative to the display position of a reference image which is, for example, a part of the second preview image 31b. The display size of the input information 43 on the write screen 40 is stored in the storage 103 as a display size relative to, for example, the display size of the reference image. The reference image may be, for example, a partial image in the second preview image 31b within a predetermined distance from the center of the reference figure 42 shown in FIG. 14. Alternatively, the reference image may be a partial image in the second preview image 31b within a predetermined distance from a predetermined position in the write screen 40, with the reference figure 42 not being displayed on the write screen 40.

Figure 15:
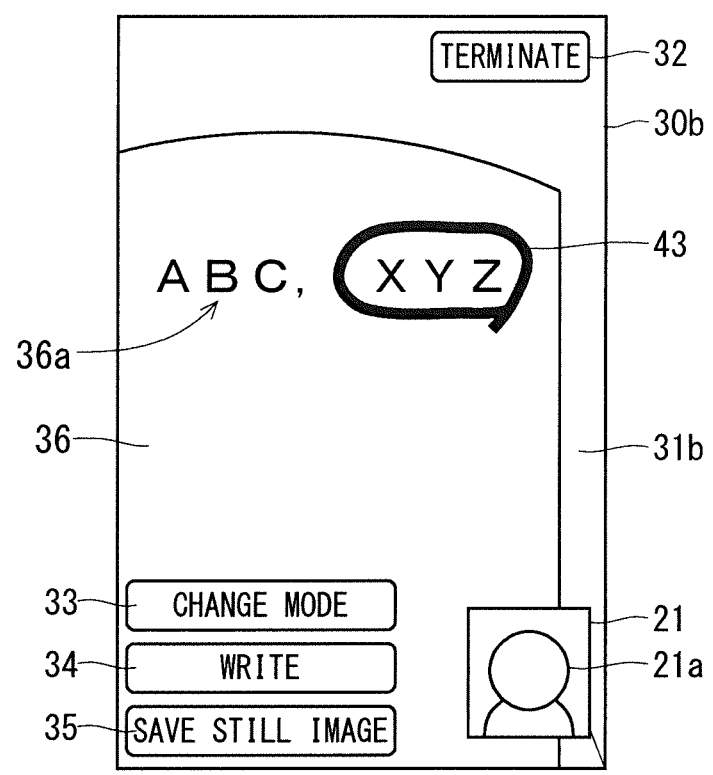
FIG. 15 schematically illustrates an example of the shared screen.

In a case where the touch panel 13 detects an operation on the termination button 41, the reception terminal 1b stops operating in the write mode. Then, in Step S33, the display 12 of the reception terminal 1b displays, on the shared screen 30b, the input information 43 displayed on the write screen 40. FIG. 15 schematically illustrates an example of the shared screen 30b displayed by the display 12 of the reception terminal 1b to which the input information 43 has been input. As illustrated in FIG. 15, the input information 43 is superimposed on the second preview image 31b on the shared screen 30b. In a case where the input information 43 is input while the display 12 operates in the preview suspension mode as described above, the display position and the display size of the input information 43 on the shared screen 30b agree with the display position and the display size of the input information 43 on the write screen 40 to which the input information 43 has been input.

Next, in Step S34, the input information layout unit 122 of the reception terminal 1b to which the input information 43 has been input creates the layout information for the transmission terminal 1a to display the input information 43. Then, the input information layout unit 122 causes the wireless transceiver 11 to transmit the created layout information to the transmission terminal 1a. The layout information includes the input information 43 and the information on the display position and the display size of the input information 43 on the shared screen 30b. In the transmission terminal 1a that has received the layout information, the input information 43 is displayed, in accordance with the layout information, on the shared screen 30b displayed by the display 12 of the transmission terminal 1a. The shared screen 30b displayed by the display 12 of the transmission terminal 1a looks similar to the shared screen 30b of the reception terminal 1b illustrated in FIG. 15.

As described above, the display 12 of the transmission terminal 1a and the display 12 of the reception terminal 1b each superimpose, onto the second preview image, the input information 43 input to the reception terminal 1b. Consequently, the user of the transmission terminal 1a and the user of the reception terminal 1b can see, along with the second preview image, the input information 43 input by the user of the reception terminal 1b.

The above-mentioned example has been described assuming that the input information 43 is input to the reception terminal 1b operating in the write mode. Alternatively, the input information 43 may be input to the transmission terminal 1a operating in the write mode in response to an operation on the write button 34 of the transmission terminal 1a. In a case where the input information 43 is input to the transmission terminal 1a, the input information layout unit 122 of the transmission terminal 1a transmits, to the reception terminal 1b through the wireless transceiver 11, the layout information for the reception terminal 1b to display the input information 43. Consequently, the display 12 of the transmission terminal 1a and the display 12 of the reception terminal 1b can each superimpose the input information 43 input to the transmission terminal 1a onto the shared image.

Displaying Input Information in Preview Mode

The following description will be given assuming that the operation mode of the display 12 is switched from the preview suspension mode to the preview mode and that the display 12 operating in the preview mode accordingly displays the input information 43 that has been superimposed on the second preview image 31b in the preview suspension mode. In the following description, the transmission terminal 1a and the reception terminal 1b will not be distinguished from each other, and are referred to as the electronic apparatuses 1.

As described above, the display position of the input information 43 input to the electronic apparatus 1 while the display 12 has been operating in the preview suspension mode is stored in the storage 103 as a display position relative to the display position of the reference image which is a part of the second preview image 31b. The display size of the input information 43 is stored in the storage 103 as the size relative to the display size of the reference image.

When the operation mode of the display 12 is switched from the preview suspension mode to the preview mode, the input information layout unit 122 performs, in the presence of the input information 43 which has been displayed in the preview suspension mode, the processing in which an image corresponding to the reference image displayed in the preview suspension mode is specified in the first preview image 31a displayed by the display 12 in the preview mode. This processing is implemented through the use of, for example, a known image recognition technique. The image recognition technique based on, for example, the feature extraction is used to specify, as the image corresponding to the reference image, an image displayed in a position different from the position of the reference image or an image having a size different from the size of the reference image. The image in the first preview image 31a corresponding to the reference image displayed in the preview suspension mode can be regarded as an image in which the subject identical to the subject seen in the reference image is seen.

In a case where the image corresponding to the reference image in the second preview image 31b is specified in the first preview image 31a, the input information layout unit 122 determines the display position and the display size of the input information 43 in the first preview image 31a on the basis of the display position and the display size of the image concerned and on the basis of the display position and the display size of the input information 43 relative to the reference image that have been stored in the storage 103. Then, the input information 43 is superimposed on the first preview image 31a. In a case where the image corresponding to the reference image is not specified in the first preview image 31a, meanwhile, the input information layout unit 122 repeats the processing of specifying such an image at predetermined time intervals until the image corresponding to the reference image is specified.

On the shared screen 30a displayed by the display 12 in the preview mode, the display position and the display size of the image in the first preview image 31a corresponding to the reference image change due to, for example, shifts in the position of the transmission terminal 1a capturing the first preview image 31a. In this case, the display position and the display size of the input information 43 change along with changes in the display position and the display size of the image in the first preview image 31a corresponding to the reference image.

Figure 16:
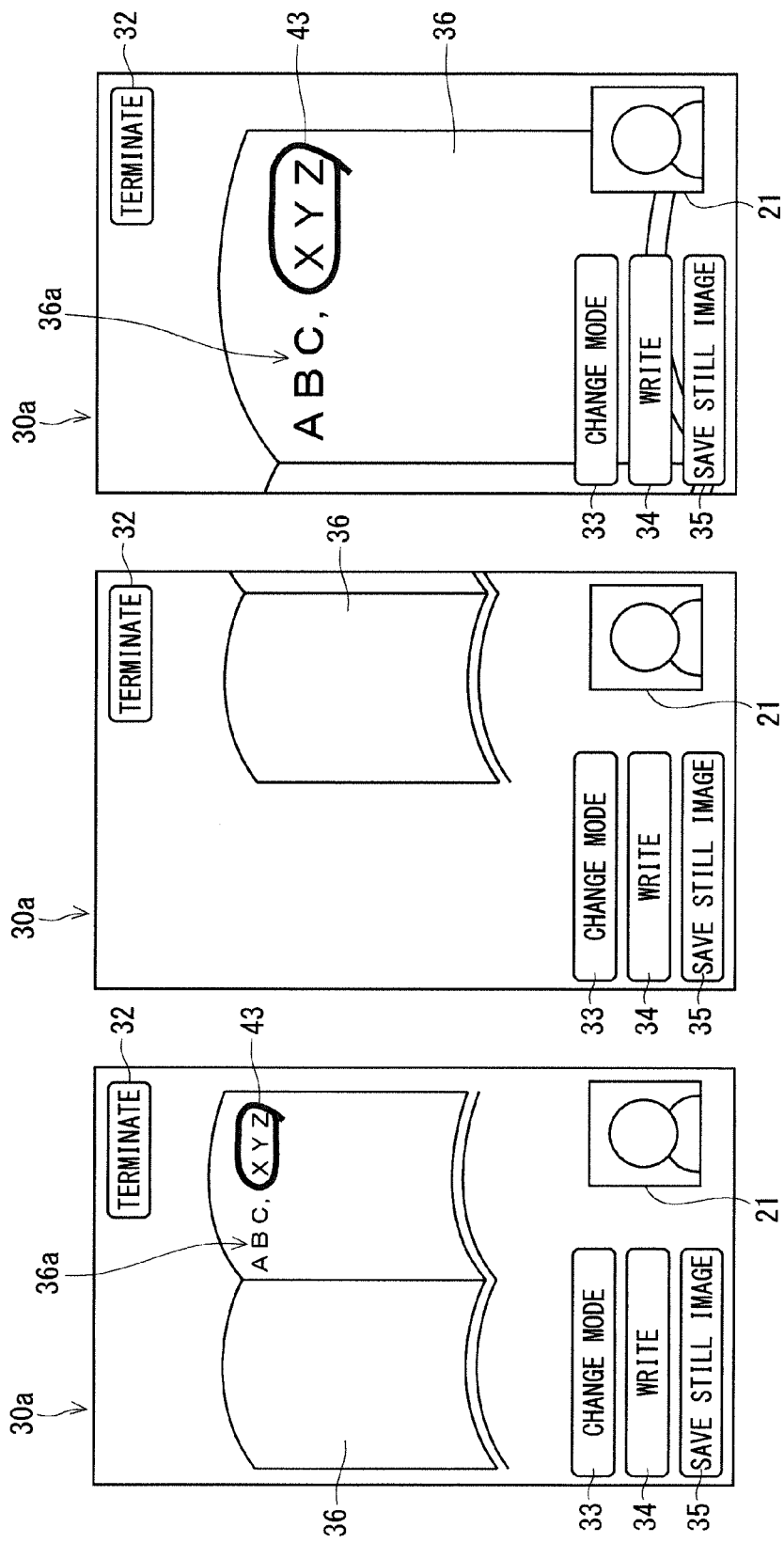
FIGS. 16A, 16B, and 16C illustrate changes in display of the input information.

FIGS. 16A, 16B, and 16C illustrate changes in display of the input information 43 on the shared screen 30a. FIGS. 16A, 16B, and 16C illustrate the state in which the input information 43 lies offscreen and the state in which the input information 43 reappears in a case where the display position and the display size of the image in the first preview image 31a corresponding to the reference image change due to, for example, shifts in the position of the transmission terminal 1a capturing the first preview image 31a. FIGS. 16A, 16B, and 16C each illustrate, in the stated order, a series of shared screens 30a chronologically displayed by the display 12 in the preview mode.

Firstly, the display 12 in the preview mode displays the shared screen 30a illustrated in FIG. 16A. In an example illustrated in FIG. 16A, the entirety of the object 36 is displayed on the shared screen 30a. The input information 43 is superimposed on the upper right portion of the object 36 in accordance with the display position and the display size relative to the image corresponding to the reference image.

Next, the display 12 displays the shared screen 30a illustrated in FIG. 16B. In an example illustrated in FIG. 16B, the transmission terminal 1a capturing the first preview image 31a in the state illustrated in FIG. 16A moves leftward, and the display 12 displays substantially the left half of the object 36 accordingly. In this case, the display position of the input information 43 is shifted in accordance with the shift in the display position of the image corresponding to the reference image. As illustrated in FIG. 16B, the input information 43 is not displayed in a case where the display position of the input information 43 based on the display position of the image in the first preview image 31a corresponding to the reference image falls outside the display range of the shared screen 30a.

Next, the display 12 displays the shared screen 30a illustrated in FIG. 16C. In an example illustrated in FIG. 16C, the transmission terminal 1a capturing the first preview image 31a in the state illustrated in FIG. 16B moves rightward so as to approach the object 36, and the display 12 displays an enlarged view of substantially the right half of the object 36 accordingly. In a case where the display position of the input information 43 based on the display position of the image in the first preview image 31a corresponding to the reference image falls within the display range of the shared screen 30a again, the input information 43 reappears. The input information 43 is enlarged in accordance with an increase in the display size of the image in the first preview image 31a corresponding to the reference image, and the enlarged view is displayed accordingly.

The processing of specifying the image in the first preview image 31a corresponding to the reference image is executed at predetermined intervals in order to change the display position and the display size of the input information 43 in accordance with changes in the display position and the display size of the image corresponding to the reference image. Once the image in the first preview image 31a corresponding to the reference image is specified, the display position and the display size of the input information 43 may be changed upon detection of changes in the display position and the display size of the image concerned. In this case, the image processing technique such as the known object tracking is used. The object tracking is implemented through, for example, calculations of the motion vector in the first preview image 31a.

As described above, the display 12 in the preview suspension mode superimposes the input information 43 input to the electronic apparatus 1 onto the second preview image 31b. In a case where the display mode of the display 12 is switched from the preview suspension mode to the preview mode, the display 12 superimposes, onto the first preview image 31a, input information 43 superimposed on the second preview image 31b in the preview suspension mode. The input information 43 superimposed on the first preview image 31a is displayed in accordance with the display position and the display size of the image in the first preview image 31a in the preview mode corresponding to the reference image in the preview suspension mode. Thus, the user of the electronic apparatus 1 can input the input information 43 he or she wants to superimpose on the first preview image 31a while looking at the second preview image 31b corresponding to the image in the first preview image 31a on which the input information 43 is to be superimposed. This allows the user to easily input the input information 43 he or she wants to superimpose on the first preview image 31a.

Information Input in Preview Mode

The following description will be given assuming that the input information 43 is input to the reception terminal 1b while the displays 12 of transmission terminal 1a and the reception terminal 1b operate in the preview mode.

In a case where an operation is performed on the write button 34 displayed by the display 12 of the reception terminal 1b while the display 12 of the transmission terminal 1a and the display 12 of the reception terminal 1b operate in the preview mode, the reception terminal 1b operates in the write mode. In a case where the reception terminal 1b is switched form the preview mode to the write mode, the first preview image 31a is displayed on the write screen 40 in place of the second preview image 31b on the write screen illustrated in FIG. 14. The input operation associated with the input information 43 is similar to the input operation in the preview suspension mode, and thus the detailed description thereof is omitted.

The display position of the input information 43 in the first preview image 31a is stored in the storage 103 as a position relative to the display position of the reference image which is, for example, a part of the first preview image 31a. The display size of the input information 43 in the first preview image 31a is stored in the storage 103 as a size relative to, for example, the display size of the reference image. The reference image may be, for example, a partial image in the first preview image 31a within a predetermined distance from the center of the reference figure 42.

Unlike the reference image being a part of the second preview image 31b, the partial image in the first preview image 31a within the predetermined distance from the center of the reference figure 42 may change due to, for example, shifts in the position of the transmission terminal 1a capturing the first preview image 31a during the input operation associated with the input information 43. Thus, the reference image may be, for example, a partial image in the first preview image 31a within the predetermined distance from the center of the reference figure 42, the first preview image 31a being displayed when the reception terminal 1b is switched from the preview mode to the write mode.

In a case where the touch panel 13 detects an operation on the termination button 41, the reception terminal 1b stops operating in the write mode. Then, the display 12 of the reception terminal 1b displays, on the shared screen 30a displayed in the preview mode, the input information 43 displayed on the write screen 40.

The display position and the display size of the input information 43 that has been input during the operation in the preview mode and is displayed on the shared screen 30a are determined on the basis of the display position and the display size of the image in the first preview image 31a corresponding to the reference image. The display position and the display size of the input information 43 are determined as is the case in which the input information 43 that has been input in the preview suspension mode is displayed in the preview mode.

Then, the input information layout unit 122 of the reception terminal 1b to which the input information 43 has been input transmits, to the transmission terminal 1a through the wireless transceiver 11, layout information for the transmission terminal 1a to display the input information 43. The layout information includes the input information 43 and the information on the display position and the display size of the input information 43 on the shared screen 30a. In the transmission terminal 1a that has received the layout information, the input information 43 is displayed, in accordance with the layout information, on the shared screen 30a displayed by the display 12 of the transmission terminal 1a.

The above-mentioned example has been described assuming that the input information 43 is input to the reception terminal 1b operating in the write mode. Alternatively, the input information 43 may be input to the transmission terminal 1a operating in the write mode in response to an operation on the write button 34 of the transmission terminal 1a. In a case where the input information 43 is input to the transmission terminal 1a, the input information layout unit 122 of the transmission terminal 1a transmits, to the reception terminal 1b through the wireless transceiver 11, the layout information for the reception terminal 1b to display the input information 43. Consequently, the display 12 of the transmission terminal 1a and the display 12 of the reception terminal 1b can superimpose the input information 43 input to the transmission terminal 1a onto the shared image.

When the display 12 is switched from the preview mode to the preview suspension mode, the display 12 superimposes, in the presence of the input information 43 which has been displayed in the preview mode, the input information 43 onto the second preview image 31b displayed in the preview suspension mode. This processing is performed as is the case in which, when the operation mode of the display 12 is switched from the preview suspension mode to the preview mode, the input information 43 that has been displayed in the preview suspension mode is superimposed onto the first preview image 31a displayed in the preview mode. In particular, in a case where the display mode of the display 12 is switched from the preview suspension mode to the preview mode, the display 12 superimposes, onto the second preview image 31b, the input information 43 that has been superimposed on the first preview image 31a in the preview mode in accordance with the display position and the display size of the image in the second preview image 31b in the preview suspension mode corresponding to the reference image in the preview mode.

Saving Shared Screen

In one embodiment, each of the transmission terminal 1a and the reception terminal 1b can save, as a still image, the shared screen displayed by the respective displays 12 in the storage 103. Furthermore, the transmission terminal 1a and the reception terminal 1b can save, as a moving image, the shared screen displayed by the respective displays 12 in the storage 103. In the following description, the transmission terminal 1a and the reception terminal 1b are not distinguished from each other, and are referred to as the electronic apparatuses 1.

Figure 17:
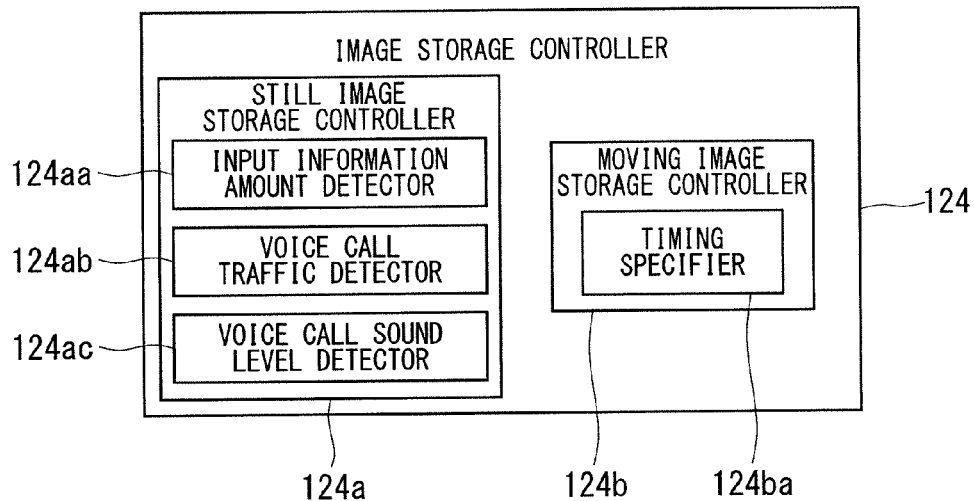
FIG. 17 illustrates an example of a functional block formed in the controller.

FIG. 17 illustrates an example of the functional block formed in the controller 10. FIG. 17 illustrates the details of the functional blocks formed in the image storage controllers 124 in FIGS. 8 and 9. As illustrated in FIG. 17, the individual image storage controller 124 includes a still image storage controller 124a for saving, as a still image, the shared screen displayed by the display 12 operating in the preview mode or the preview suspension mode in the storage 103. The image storage controller 124 further includes a moving image storage controller 124b for saving, as a moving image, the shared screen displayed by the display 12 operating in the preview mode or the preview suspension mode in the storage 103. The still image storage controller 124a includes an input information amount detector 124aa, a voice call traffic detector 124ab, and a voice call sound level detector 124ac. The moving image storage controller 124b includes a timing specifier 124ba.

In a case where the touch panel 13 has detected an operation on the still image save button 35 on the shared screen 30b displayed by the display 12 operating in the preview suspension mode, the still image storage controller 124a can save the shared screen 30b as a still image in the storage 103. In a case where the touch panel 13 has detected an operation on the still image save button 35 on the shared screen 30a displayed by the display 12 operating in the preview mode, the still image storage controller 124a can save the shared screen 30a as a sill image in the storage 103. In one example, a still image is saved in the storage 103 by the still image storage controller 124a storing the still image in a nonvolatile memory of the storage 103, such as a flash ROM. In a case where the shared screen 30a or the shared screen 30b includes the input information 43 input to the electronic apparatus 1, the sill image saved in the storage 103 by the still image storage controller 124a includes the input information 43 accordingly.

When the touch panel 13 detects an operation on the still image save button 35 displayed by the display 12, the still image storage controller 124a saves, as a still image, the shared screen displayed by the display 12 in the storage 103. Thus, the user can cause the electronic apparatus 1 to save, as a still image, the shared screen displayed by the display 12 in the storage 103 at a desired timing. The user can later review the still image saved in the storage 103.

The input information amount detector 124aa can detect the information amount of the input information 43 displayed on the shared screen 30b displayed by the display 12 operating in the preview suspension mode. The information amount of the input information 43 is, for example, the display image data size of the input information 43. In a case where the information amount of the input information 43 on the shared screen 30b displayed by the display 12 operating in the preview suspension mode has reached or exceeded a predetermined amount, the still image storage controller 124a can save the shared screen 30b as a still image in the storage 103. The input information amount detector 124aa also detects the information amount of the input information 43 displayed on the shared screen 30a displayed by the display 12 operating in the preview mode. In a case where the information amount of the input information 43 on the shared screen 30a displayed by the display 12 operating in the preview mode has reached or exceeded the predetermined amount, the still image storage controller 124a can save the shared screen 30a as a still image in the storage 103.

In a case where the information amount of the input information 43 displayed on the shared screen has reached or exceeded the predetermined amount, the still image storage controller 124a saves the shared screen as a still image in the storage 103. Thus, the user can later review the shared screen including the predetermined amount or more of the input information 43.

In a case where the electronic apparatus 1 operates in the video call mode, the voice call traffic detector 124ab can detect the call traffic during a predetermined time period. The voice call traffic detector 124ab detects the call traffic during the predetermined time period on the basis of, for example, the amount of data of sound signals transmitted or received by the wireless transceiver 11. For example, the voice call traffic detector 124ab may treat, as the call traffic during the predetermined time period, the amount of data of sound signals transmitted or received by the wireless transceiver 11 during the predetermined time period. The voice call traffic detector 124ab may include, for example, a voice recognizer that recognizes a voice of the user through the use of the known voice recognition technique, and may detect the call traffic during the predetermined time period on the basis of the amount of voice recognized by the voice recognizer. In a case where the voice call traffic detector 124ab includes a voice recognizer that recognizes a voice of each user, the voice call traffic detector 124ab may detect the call traffic during the predetermined time period for each user by, for example, recognizing the voice of each user.

In a case where the call traffic during the predetermined time period that is detected by the voice call traffic detector 124ab has reached or exceeded the predetermined amount, the still image storage controller 124a can save, as a still image, the screen displayed by the display 12 in the storage 103. In a case where the call traffic during the predetermined time period has reached or exceeded the predetermined amount, or equivalently, in the event of, for example, a lively conversation between the users, each user can later review the screen that has been displayed by the display 12.

The voice call sound level detector 124ac can detect the voice call sound level while the electronic apparatus 1 operates in the video call mode. The voice call sound level detector 124ac detects the voice call sound level by, for example, detecting the level of a sound output from the speaker 18 of the electronic apparatus 1 or detecting the level of a sound input to the microphone 14.

In a case where the output sound level or the input sound level has reached or exceeded a predetermined value, the still image storage controller 124a can save, as a still image, the shared screen displayed by the display 12 in the storage 103. In a case where the voice call sound level is high, or equivalently, in the event of a lively conversation between the users, each user can later review the screen that has been displayed by the display 12.

In the above-mentioned example, the electronic apparatus 1 has the video call function. Alternatively, the electronic apparatus 1 may have a call function that is not based on a video call but is based only on voices. When the image sharing application is executed, the electronic apparatus 1 may operate in a voice call mode, in which only a voice call can be performed, instead of operating in the video call mode. In this case, the voice call traffic detector 124ab may detect the call traffic while the electronic apparatus 1 performs a call based only on voices. The voice call sound level detector 124ac may detect the voice call sound level while the electronic apparatus 1 performs a call based only on voices.

The moving image storage controller 124b may save, as a moving image, a series of images displayed by the display 12 from start to finish of the execution of the image sharing application in the storage 103. In other words, the moving image storage controller 124b may save, as a moving image, a series of images displayed by the display 12 during the operation of the electronic apparatus 1 in the video call mode in the storage 103. For example, a moving image is saved in the storage 103 by the moving image storage controller 124b storing the moving image in a nonvolatile memory of the storage 103. The moving image storage controller 124b may save, in the storage 103, a series of images displayed by the display 12 within the entire period from start to finish of the execution of the image sharing application (the entire period over which the electronic apparatus 1 operates in the video call mode). Alternatively, the moving image storage controller 124b may store, in the storage 103, a series of images displayed by the display 12 within a part of the period from start to finish of the execution of the image sharing application. For example, the moving image storage controller 124b may save, in the storage 103, a series of images displayed by the display 12 within the time period over which the display 12 operates in the preview suspension mode and the preview mode out of the time period over which the electronic apparatus 1 operates in the video call mode. Still alternatively, the moving image storage controller 124b may save, as a moving image, a series of images displayed by the display 12 within the time period specified by the user in the storage 130.

The moving image storage controller 124b saves, as a moving image, the screen that has been displayed by the display 12 during the execution of the image sharing application in the storage 103, so that the user can later review a series of images included in the moving image saved in the storage 103 by the moving image storage controller 124b.

The timing specifier 124ba specifies a timing at which the still image storage controller 124a saves a still image in the storage 103 within a time period over which a series of images forming a moving image to be saved by the moving image storage controller 124b is displayed during the execution of the image sharing application. In other words, the timing specifier 124ba specifies a timing at which the still image storage controller 124a saves a still image in the storage 103 within a time period over which a series of images forming a moving image to be saved by the moving image storage controller 124b is displayed in the video call mode. Then, the timing specifier 124ba saves the specified timing in the storage 103. In particular, the timing specifier 124ba acquires the timing at which the still image storage controller 124a has saved a still image in the storage 103 with reference to, for example, the time information acquired by the clocking unit 19. Then, the timing specifier 124ba causes the storage 103 to store the information that correlates the acquired timing with the still image saved at the timing. In some cases, the timing specifier 124ba adds timing information, such as the chapter information, to the moving image saved in the storage 103 by the moving image storage controller 124b with reference to the acquired timing.

Figure 18:
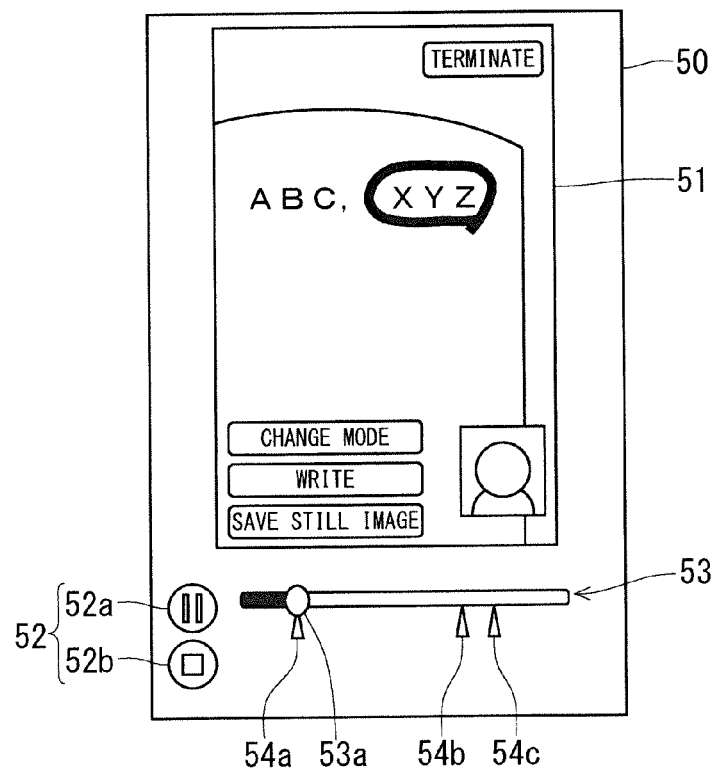
FIG. 18 schematically illustrates an example of a playback screen.

FIG. 18 schematically illustrates an example of a playback screen 50 while the display 12 displays (plays back) the moving image saved in the storage 103 by the moving image storage controller 124b. As illustrated in FIG. 18, displayed on the playback screen 50 are a moving image 51 saved in the storage 103 by the moving image storage controller 124b, buttons 52 for controlling the playback of the moving image 51, and a seek bar 53 indicating a playback position in the moving image 51. The length of the seek bar 53 indicates a time period over which a series of images forming the moving image 51 has been displayed by the display 12 during the execution of the image sharing application. In an example illustrated in FIG. 18, the buttons 52 include a button 52a for controlling the playback of the moving image 51 to start or pause and a stop button 52b for stopping the playback of the moving image 51. Displayed on the seek bar 53 are a slider 53a for changing the playback position in the moving image 51 and figures 54a to 54c indicating the timing at which the still image storage controller 124a saved the still image in the storage 103. For example, in a case where the touch panel 13 has detected an operation on any of the figures 54a to 54c, the playback position in the moving image 51 is shifted correspondently to the timing indicated by the relevant figure.

Figure 19:
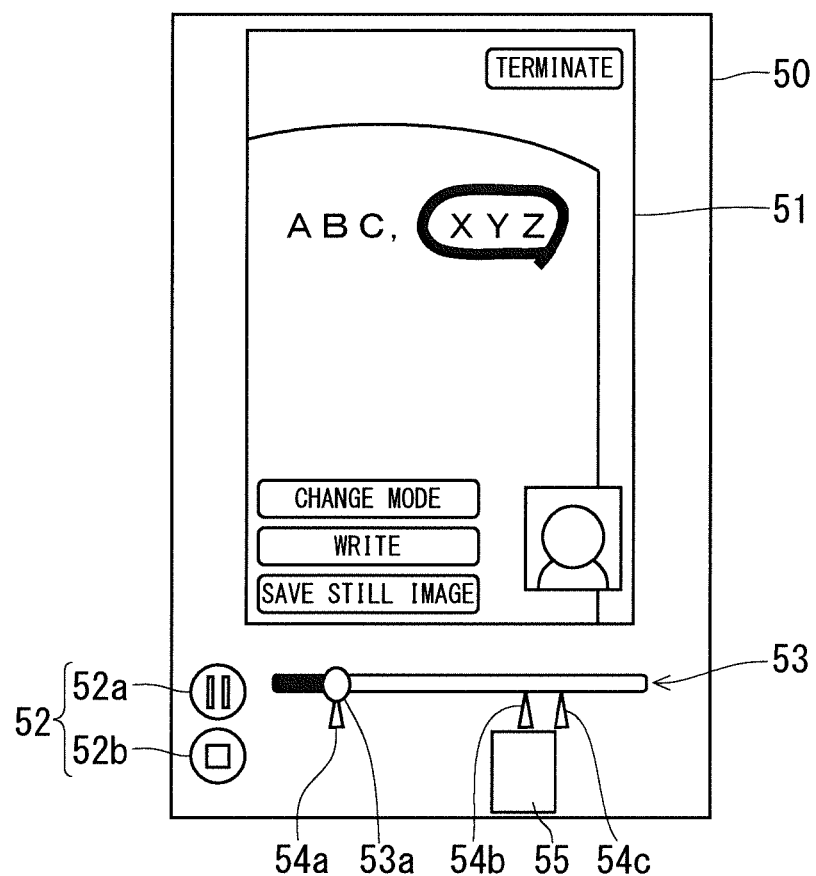
FIG. 19 schematically illustrates an example of the playback screen.

In a case where the touch panel 13 has detected an operation on any of the figures 54a to 54c, the still image saved in the storage 103 at the timing indicated by the relevant one of the figures 54a to 54c may be displayed on the playback screen 50. FIG. 19 schematically illustrates an example of the playback screen 50 on which the still image saved at the timing indicated by the figure 54b is displayed. In an example illustrated in FIG. 19, in a case where the touch panel 13 has detected an operation on the figure 54b, a still image 55, which was saved in the storage 103 by the still image storage controller 124a at the timing indicated by the figure 54b, is displayed below the figure 54b. In this case, the display 12 may display an enlarged view of the still image 55 in response to a selection operation on the still image 55 detected by the touch panel 13.

As described above, the timing specifier 124ba saves the timing at which the still image storage controller 124a saves a still image in the storage 103 within a time period over which a series of images forming a moving image to be saved in the storage 103 by the moving image storage controller 124b is displayed by the display 12 during the execution of the image sharing application. This means that the timing specifier 124ba saves a timing at which the still image storage controller 124a saves a still image in the storage 103 within a time period over which a series of images forming a moving image to be saved in the storage 103 by the moving image storage controller 124b is displayed in the video call mode. Thus, the user can recognize at which timing, within a time period over which a series of images forming the moving images is displayed by the display 12 during the execution of the image sharing application, the still image was saved in the storage 103 by the still image storage controller 124a.

Although techniques according to the present disclosures have been applied to mobile phones in the above description, techniques according to the present disclosure are also applicable to other electronic apparatuses including displays. For example, techniques according to the present disclosure are applicable to personal computers, tablet terminals, and wearable electronic apparatuses designed to be worn on arms or the like.

While the electronic apparatus has been described above in detail, the above description is in all aspects illustrative and not restrictive. In addition, various modifications described above are applicable in combination as long as they are not mutually inconsistent. It is understood that numerous modifications which have not been exemplified can be devised without departing from the scope of the present disclosure.

The invention claimed is:

1. An electronic apparatus comprising:
a first display;
a storage; and
a controller,
wherein
the controller is configured to switch between a first display mode in which the first display is configured to display a first image and a second display mode in which the first display is configured to display a second image, the first image being a series of images captured by the electronic apparatus or an apparatus other than the electronic apparatus and being shared by the first display and a second display of the apparatus other than the electronic apparatus, the second image being an image at a point in time in the first image and being shared by the first display and the second display,
the controller is configured to cause the first display in the second display mode to superimpose first input information input to the electronic apparatus or the apparatus other than the electronic apparatus onto the second image, and is configured to cause the first display to superimpose, in a case where a display mode of the first display is switched from the second display mode to the first display mode, the first input information superimposed on the second image in the second display mode onto an image corresponding to the second image in the first image,
the controller is configured to save a part of the first image as a still image in the storage,
the controller is capable of setting a call mode in each of the first and second display modes, and
the controller is configured to detect a voice call traffic in the call mode, and is configured to save the still image in the storage in a case where the voice call traffic during a predetermined time period reaches or exceeds a non-zero threshold.

2. The electronic apparatus according to claim 1, wherein the controller is configured to cause the first display in the first display mode to superimpose second input information input to the electronic apparatus or the apparatus other than the electronic apparatus onto the first image.

3. The electronic apparatus according to claim 2, wherein the controller is configured to detect an information amount of the second input information, and is configured to save, as a still image, a part of the first image including the second input information superimposed thereon in the storage in a case where the information amount reaches or exceeds a non-zero threshold.

4. The electronic apparatus according to claim 3, further comprising an operation detector configured to detect an operation on the electronic apparatus, wherein the controller is configured to save the still image in the storage in a case where the operation detector detects a predetermined operation on the electronic apparatus.

5. The electronic apparatus according to claim 1, wherein the controller is configured to detect an information amount of the first input information, and is configured to save, as the still image, the second image including the first input information superimposed thereon in the storage in a case where the information amount reaches or exceeds a non-zero threshold.

6. The electronic apparatus according to claim 1, further comprising an operation detector configured to detect an operation on the electronic apparatus, wherein the controller is configured to save the still image in the storage in a case where the operation detector detects a predetermined operation on the electronic apparatus.

7. The electronic apparatus according to claim 1, wherein the controller is configured to detect an output sound level or an input sound level of the electronic apparatus in the call mode, and is configured to save the still image in the storage in a case where the output sound level or the input sound level reaches or exceeds a non-zero threshold.

8. The electronic apparatus according to claim 1, wherein the controller is configured to save, as a moving image, a series of images displayed by the first display in the call mode in the storage.

9. The electronic apparatus according to claim 8, wherein the controller is configured to save, in the storage, a timing at which the controller saves the still image in the storage within a time period over which the series of images forming the moving image is displayed in the call mode.

10. An image display system comprising:
a plurality of electronic apparatuses including a plurality of displays; and
a controller,
wherein
each of the plurality of displays has a first display mode in which the display is configured to display a first image and a second display mode in which the display is configured to display a second image, the first image being a series of images captured by one of the plurality of electronic apparatuses and being shared by the plurality of displays, the second image being an image at a point in time in the first image and being shared by the plurality of displays,
each of the plurality of displays in the second display mode is configured to superimpose input information input to one of the plurality of electronic apparatuses onto the second image,
each of the plurality of displays is configured to superimpose, in a case where a display mode of the display is switched from the second display mode to the first display mode, the input information superimposed on the second image in the second display mode onto an image corresponding to the second image in the first image,
the controller is configured to save the second image as a still image in storage, and
the controller is configured to detect an information amount of the input information, and is configured to save, as the still image, the second image including the input information superimposed thereon in the storage in a case where the information amount reaches or exceeds a non-zero threshold.

11. A non-transitory computer readable recording medium that stores a control program for controlling an electronic apparatus, the control program causing the electronic apparatus to execute the steps of:
(a) displaying a first image that is a series of images captured by one of a plurality of apparatuses including the electronic apparatus and is shared by the plurality of apparatuses;
(b) displaying a second image that is an image at a point in time in the first image and is shared by the plurality of apparatuses, wherein
in the step (b), the control program causes the electronic apparatus to superimpose first input information input to one of the plurality of apparatuses onto the second image, and
in the step (a), the control program causes the electronic apparatus to superimpose the first input information superimposed on the second image in the step (b) onto an image corresponding to the second image in the first image, and causes the electronic apparatus to superimpose second input information input to one of the plurality of apparatuses onto the first image; and
(c) detecting an information amount of the second input information, and saving, as a still image, a part of the first image including the second input information superimposed thereon in storage in a case where the information amount reaches or exceeds a non-zero threshold.

* * * * *